United States Patent
Fernandez et al.

(10) Patent No.: US 12,448,118 B2
(45) Date of Patent: Oct. 21, 2025

(54) DEVICE FOR DRIVING AT LEAST ONE WHEEL OF AN AIRCRAFT LANDING GEAR

(71) Applicant: Safran Transmission Systems, Colombes (FR)

(72) Inventors: Maxime Fernandez, Moissy-Cramayel (FR); Loic Francois, Moissy-Cramayel (FR); Boris Pierre Marcel Morelli, Moissy-Cramayel (FR); Jordane Emile Andre Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/457,875

(22) Filed: Aug. 29, 2023

(65) Prior Publication Data

US 2024/0092477 A1 Mar. 21, 2024

(30) Foreign Application Priority Data

Sep. 16, 2022 (FR) ........................................ 2209341

(51) Int. Cl.
*B64C 25/40* (2006.01)
*B64C 25/32* (2006.01)
(Continued)

(52) U.S. Cl.
CPC ............ *B64C 25/405* (2013.01); *B64C 25/34* (2013.01); *F16H 1/24* (2013.01); *F16H 1/2809* (2013.01)

(58) Field of Classification Search
CPC ......... B64C 25/405; B64C 25/34; F16H 1/24; F16H 1/28; F16H 1/2809; F16H 57/082; F16H 57/087
See application file for complete search history.

(56) References Cited

U.S. PATENT DOCUMENTS 3,711,043 A * 1/1973 Cameron-Johnson ....................... B64C 25/405 244/50
8,136,755 B2 * 3/2012 Hadley .................. B64C 25/50 244/50

(Continued)

FOREIGN PATENT DOCUMENTS

EP 3882136 A1 9/2021
EP 4001619 A1 5/2022

(Continued)

OTHER PUBLICATIONS

Preliminary Research Report received for French Application No. 2209341, mailed on Apr. 17, 2023, 3 pages (1 page of French Translation Cover Sheet and 2 pages of original document).

*Primary Examiner* — Philip J Bonzell
(74) *Attorney, Agent, or Firm* — WOMBLE BOND DICKINSON (US) LLP (57) ABSTRACT

A device for driving at least one wheel of an aircraft landing gear including at least one landing gear wheel, this wheel including a rim, an electric motor including a shaft, a mechanical transmission system between the shaft of the motor and the rim, this mechanical transmission system including a mechanical reducer including a sun gear secured in rotation to the shaft of the motor, a ring gear, and planet gears which are carried by a planet carrier and which each includes three external toothings, including a median external toothing which is meshed with a toothing of the sun gear, and two lateral external toothings which are respectively meshed with toothings of the ring gear.

12 Claims, 10 Drawing Sheets

(51) Int. Cl.
*B64C 25/34* (2006.01)
*F16H 1/24* (2006.01)
*F16H 1/28* (2006.01)

(56) References Cited

U.S. PATENT DOCUMENTS

| | | | |
|---|---|---|---|
| 10,807,467 B2* | 10/2020 | Rotenberg | B60K 17/046 |
| 11,603,189 B2* | 3/2023 | Schmidt | B64C 25/36 |
| 11,708,154 B2* | 7/2023 | Schmidt | B64C 25/405 |
| | | | 244/103 S |
| 2007/0042854 A1* | 2/2007 | Edelson | F16H 3/56 |
| | | | 475/149 |
| 2007/0158497 A1* | 7/2007 | Edelson | B64C 25/405 |
| | | | 244/103 S |
| 2009/0026312 A1* | 1/2009 | Hadley | B64C 25/50 |
| | | | 244/100 R |
| 2016/0116055 A1* | 4/2016 | Engblom | F16H 57/082 |
| | | | 475/331 |
| 2018/0170527 A1 | 6/2018 | Roques et al. | |
| 2019/0291575 A1* | 9/2019 | Rotenberg | B60K 7/0007 |
| 2022/0145806 A1 | 5/2022 | Beck et al. | |
| 2022/0219812 A1* | 7/2022 | Schmidt | B64C 25/36 |
| 2022/0219813 A1* | 7/2022 | Schmidt | B64C 25/405 |

FOREIGN PATENT DOCUMENTS

| | | |
|---|---|---|
| WO | 2005/035358 A2 | 4/2005 |
| WO | 2016/202909 A1 | 12/2016 |
| WO | 2022/150906 A1 | 7/2022 |

* cited by examiner

DEVICE FOR DRIVING AT LEAST ONE WHEEL OF AN AIRCRAFT LANDING GEAR

TECHNICAL FIELD OF THE INVENTION

The present invention relates to a device for driving at least one wheel of an aircraft landing gear.

TECHNICAL BACKGROUND

The technical background comprises in particular the documents WO-A1-2016/202909, EP-A1-4 001 619, WO-A-1-2022/150906 and WO-A2-2005/035358.

An aircraft comprises landing gears equipped with wheels for moving the aircraft on the ground over a tarmac. This taxiing can be achieved by propelling the aircraft using its turbomachines.

To limit the fuel consumption and the environmental impact, it is known to carry out this taxiing electrically. The electric taxiing is achieved by driving the wheels of a landing gear by an electric motor.

The present application proposes an improvement on existing technologies and thus relates to an electric motor device for driving at least one wheel of an aircraft landing gear.

A solution consisting of using a reducer to transmit the power of an electric motor to a wheel of a landing gear was proposed by the Applicant in the document EP-A1-3 882 136.

The role of a mechanical reducer is to modify the speed and torque ratio between the input axle and the output axle of a mechanical system.

In the remote field of the aircraft turbomachines, a mechanical reducer is used to transmit power between two rotating mechanical shafts.

There are many different types of reducers, for example differential, planetary, epicyclic, with intermediate lines, with reduction stages in series, etc.

In the prior art of the double-flow turbomachines, the reducers are of the planetary or epicyclic type. Such a reducer comprises a central pinion, referred to as sun gear, a ring gear and pinions referred to as planet gears, which are engaged between the sun gear and the ring gear. The planet gears are maintained by a frame referred to as planet carrier. The sun gear, the ring gear and the planet carrier are planetary because their axes of revolution coincide with the longitudinal axis of the turbomachine. The planet gears each have a different axis of revolution equally distributed on the same operating diameter around the axis of the planetaries. These axes are parallel to the longitudinal axis of the turbomachine.

There are several reducer architectures. In other similar applications, there are architectures referred to as differential or "compound".

In a planetary reducer, the planet carrier is stationary and the ring gear is the output shaft of the device which rotates in the opposite orientation of the sun gear.

In an epicyclic reducer, the ring gear is stationary and the planet carrier is the output shaft of the device which rotates in the same orientation as the sun gear.

On a compound reducer, no element is attached in rotation. The ring gear rotates in the opposite orientation of the sun gear and the planet carrier.

The reducers can consist of one or more gear stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two gearing stages. A single-stage planet gear comprises a toothing that can be straight, helical or herringbone, and whose teeth are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

A reducer with a gearing dual-stage has the advantage of having a higher reduction ratio than a reducer with a single gearing stage of the same cluttering.

In the context of a device for driving at least one wheel of a landing gear, the use of an electric motor and a reducer to drive the wheel generates considerable overall dimensions constraints. The outer diameter of the reducer is limited by the size of the rim of the wheel, and the inner diameter of the reducer is strongly constrained by the diameter of the hub of the wheel. In addition, the use of an electric motor generally rotating at high speeds requires the use of a reducer with a high reduction ratio in order to offer an output speed that corresponds to the low speed of rotation of the wheel. The current epicyclic and planetary gear trains do not offer these levels of reduction in such a small space.

The invention proposes a solution to at least some of these problems, which is simple, effective and economical.

SUMMARY OF THE INVENTION

The invention relates to a device for driving at least one wheel of an aircraft landing gear, this device comprising:
  at least one landing gear wheel, this wheel comprising a rim with an axis of rotation,
  an electric motor comprising a shaft,
  a mechanical transmission system between the shaft of the motor and the rim, this mechanical transmission system comprising a mechanical reducer,
  characterised in that the mechanical reducer comprises:
  a sun gear secured in rotation to the shaft of the motor, this sun gear being centred on the axis and comprising an external toothing,
  a ring gear centred on the axis and comprising two internal toothings, and
  planet gears which are carried by a planet carrier and which each have a median plane of symmetry perpendicular to the axis, each of the planet gears comprising three external toothings, including a median external toothing which is meshed with the toothing of the sun gear, and two lateral external toothings which are respectively disposed on either side of the median external toothing and which are respectively meshed with the toothings of the ring gear.

The invention thus proposes a device for driving at least one wheel of an aircraft landing gear, which is equipped with an epicyclic or planetary train reducer with symmetrical double-stage planet gears.

A first stage of each planet gear, formed by the median toothing of each planet gear, meshes with the toothing of the sun gear.

A second stage of each planet gear, formed by the two lateral toothings of each planet gear, meshes with the ring gear, which itself has two toothings.

In one embodiment, the ring gear is stationary and it is the planet carrier that is movable in rotation and connected to the rim of the wheel. Alternatively, the planet carrier is stationary and it is the ring gear that is movable in rotation and is connected to the rim of the wheel. The sun gear is connected to the rotor of the electric motor.

The invention is compatible with a multi-stage reducer as described above. It is also compatible with a reducer whose planet carrier or ring gear is movable in rotation, such as an epicyclic, planetary or differential reducer. It is also compatible with any type of toothings (straight, helical, herringbone, etc.). The invention is further compatible with a planet carrier of the monobloc type or of the cage and cage carrier type. These different types of reducers are well known to the person skilled in the art. The solution proposed below is compatible with any type of planet gear bearing, whether it consists of rolling elements, a hydrodynamic bearing, etc.

The device according to the invention may comprise one or more of the following characteristics, taken alone or in combination with each other:
- the ring gear is stationary and is attached to a stator of the device, and the planet carrier is movable in rotation about the axis and is attached to the rim;
- the ring gear is movable in rotation about the axis and is attached to the rim, and the planet carrier is stationary and is attached to a stator of the device;
- the toothings of the ring gear are identical;
- the toothing of the sun gear and the median external toothing of each of the planet gears are herringbone-shaped;
- the lateral external toothings of each of the planet gears and the toothings of the ring gear are helical;
- the motor has an annular shape centred on the axis and is arranged next to the reducer;
- the motor is arranged next to and at the level of the planet gears;
- the diameter of the median toothing is greater than the diameter of the lateral toothing;
- the planet carrier comprises a single transverse wall which is perpendicular to the axis and on which the planet gears are cantilevered.
- the planet carrier comprises two transverse walls which are perpendicular to the axis and between which the planet gears are mounted, at least one or both of these transverse walls comprising a central orifice for the passage of the shaft of the motor;
- the planet gears are each centred and guided by:
  - two roller bearings carried by the planet carrier, the toothings of each of the planet gears being located axially between these roller bearings,
  - or three needle bearings carried by the planet carrier, each of the needle bearings being radially in line with one of the toothings of the planet gear.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
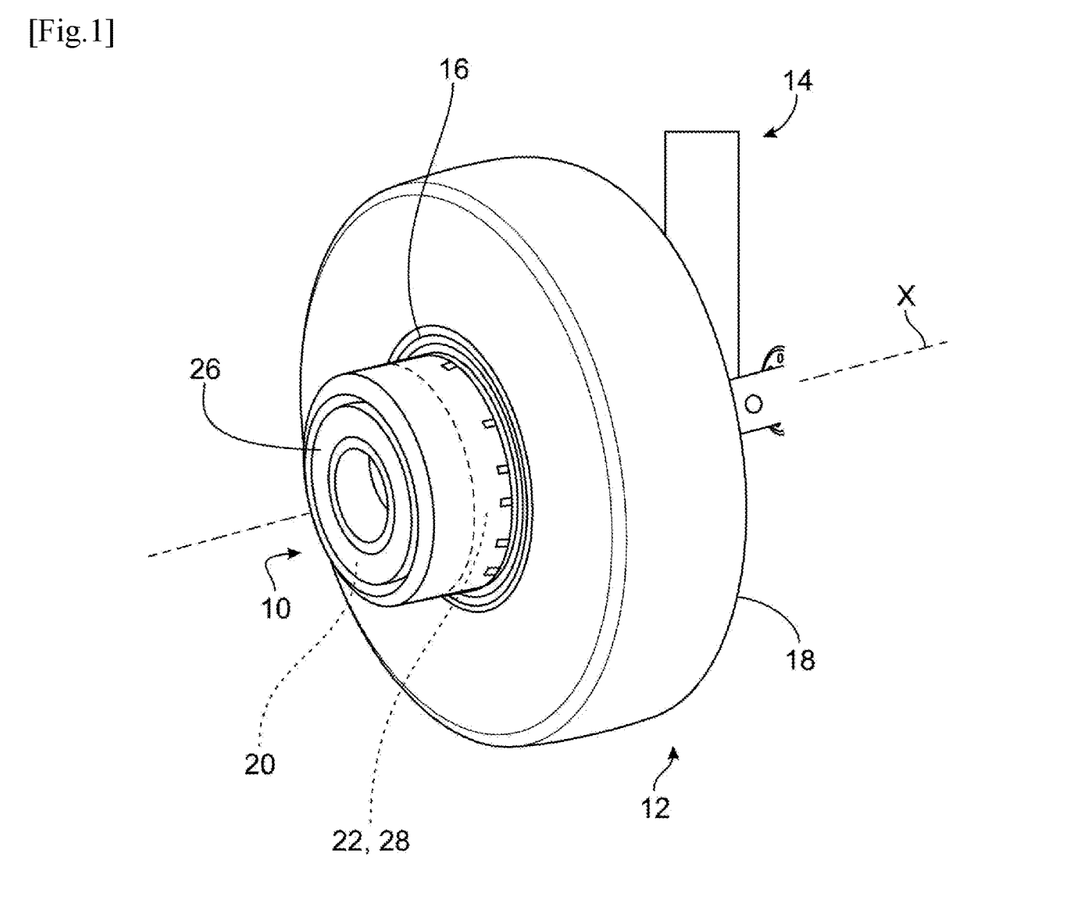
FIG. 1 is a schematic perspective view of a wheel of an aircraft landing gear and a device for driving this wheel.

FIG. 1 shows a device 10 for driving at least one wheel 12 of an aircraft landing gear 14.

The wheel 12 comprises a rim 16 with an axis of rotation X. Conventionally, this rim 16 is generally tubular or disc-shaped and carries a tyre 18 on its periphery.

The device 10 comprises an electric motor 20 and a mechanical transmission system 22 between a shaft of the motor 20 and the rim 16 of the wheel 12.

In the example shown, the motor 20 and the system 22 each have a generally annular shape and are centred on the axis X. They are arranged next to each other and the system 22 is installed between the motor 20 and the rim 16. A portion of the system 22, or even a portion of the motor 20, could be housed in the rim 16 to limit the overall dimensions of the device 10. The motor 20 and the system 22 can be protected by an outer cylindrical cover 26 projecting from one side of the rim 16 or of the tyre 18.

The mechanical transmission system 22 comprises a mechanical reducer 28, examples of embodiment of which are shown in FIGS. 2 to 5.

Figure 2:
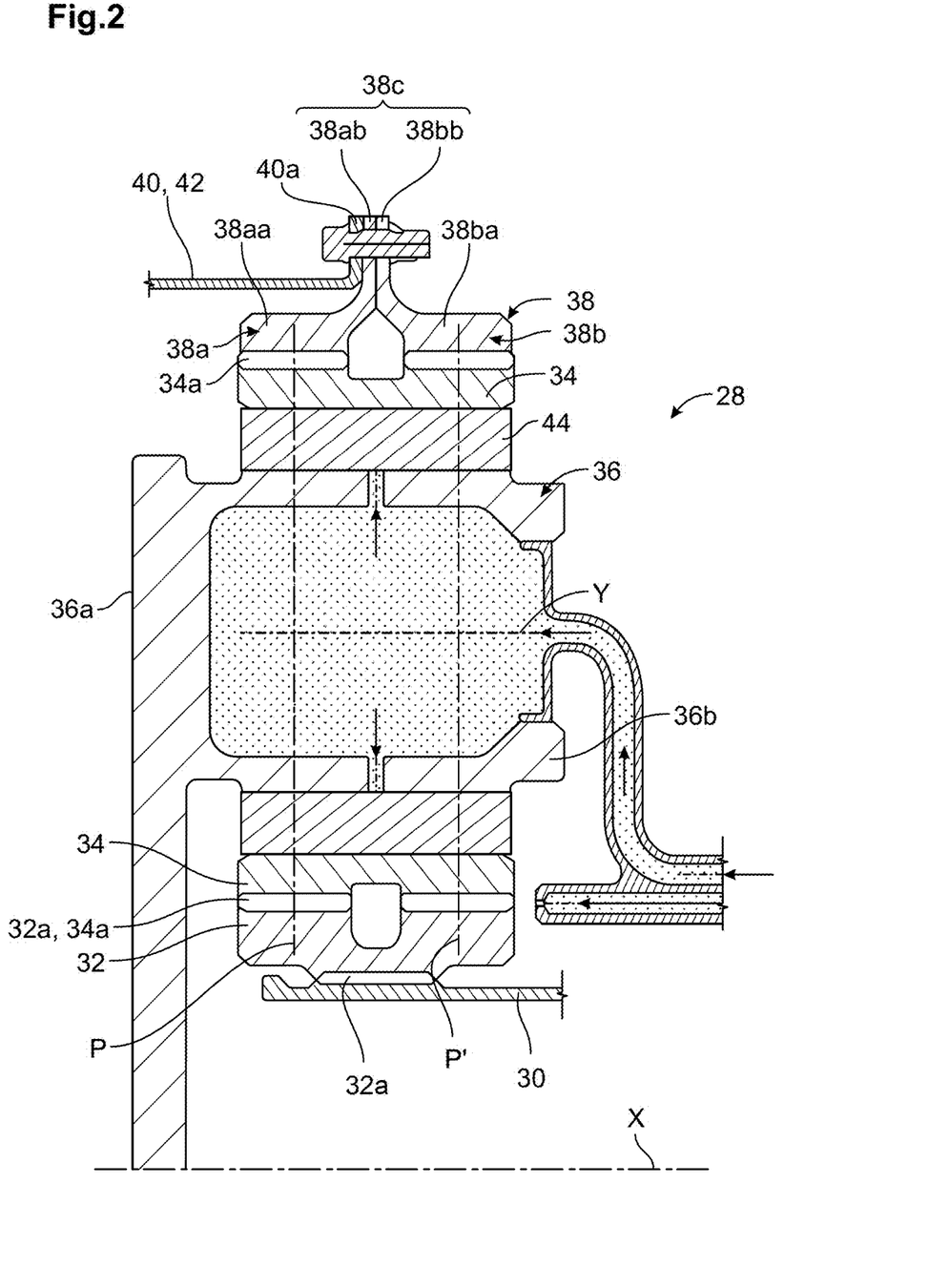
FIG. 2 is a partial axial sectional view of a mechanical reducer.

FIG. 2 shows an epicyclic reducer 28. At the input, the reducer 28 is connected to a shaft 30, for example by means of internal splines 32a. The shaft 30 drives a planetary pinion referred to as the sun gear 32. Typically, the sun gear 32 drives a series of pinions referred to as planet gears 34, which are equally spaced on the same diameter around the axis X of rotation of the sun gear 32. This diameter is equal to twice the operating centre distance between the sun gear 32 and the planet gears 34. The number of planet gears 34 is generally defined as between three and seven.

The assembly of the planet gears 34 is held by a frame referred to as planet carrier 36. Each planet gear 34 rotates about its own axis Y and meshes with a ring gear 38.

In the output we have:

In this epicyclic configuration, the assembly of the planet gears 34 drive in rotation the planet carrier 36 about the axis X. The ring gear 38 is attached to a stator via a ring gear carrier 40 and the planet carrier 36 is attached to another shaft 42.

In another planetary configuration, the assembly of the planet gears 34 is held by a planet carrier 36 which is attached to a stator. Each planet gear drives the ring gear 38 which is connected to the shaft 42 via a ring gear carrier 40.

In another differential configuration, the assembly of the planet gears 34 is held by a planet carrier 36 which is connected to the shaft 30. Each planet gear 34 drives the ring gear 38 which is fitted to the shaft 42 via a ring gear carrier 40.

Each planet gear 34 is mounted free in rotation by means of a bearing 44, for example of the rolling or hydrodynamic bearing type. Each bearing 44 is mounted on one of the axles 36b of the planet carrier 36 and all the axles 36b are positioned relative to each other using one or more structural frames 36a of the planet carrier 36. The number of axles 36b and bearings 44 is equal to the number of planet gears 34. For reasons of operation, assembly, manufacture, inspection, repair or replacement, the axles 36b and the frame 36a may be separated into several parts.

For the same reasons mentioned above, the toothing 34a of a planet gear 34 can be separated into several helices or teeth each having a median plane P, P'. In the example shown, each planet gear 34 comprises two series of herringbone teeth cooperating with a ring gear 38 separated into two half-ring gears:

An upstream annulus 38a consisting of a rim 38aa and an attachment half-flange 38ab. On the rim 38aa is the front helix meshed with a helix of the toothing 34a of each planet gear 34. The helix of the toothing 34a also meshes with that of sun gear 32.

A downstream annulus 38b consisting of a rim 38ba and an attachment half-flange 38bb. The rear helix is located on the rim 38ba and is meshed with a helix of the toothing 34a of each planet gear 34. The helix of the toothing 34a also meshes with that of sun gear 32.

If the helix widths vary between the sun gear 32, the planet gears 34 and the ring gear 38 because of the toothing overlaps, they are all centred on a median plane P for the upstream teeth and on another median plane P' for the downstream teeth.

FIG. 2 illustrates the case of a reducer with a single meshing stage, i.e., the same toothing 34a of each planet gear 34 cooperates with both the sun gear 32 and the ring gear 38. Although the toothing 34a comprises two sets of teeth, these teeth have the same average diameter and form a single toothing referred to as herringbone.

The attachment half-flange 38ab of the upstream annulus 38a and the attachment half-flange 38bb of the downstream annulus 38b form the attachment flange 38c of the ring gear. The ring gear 38 is attached to the ring gear carrier 40 by assembling the attachment flange 38c of the ring gear 38 and an attachment flange 40a of the ring gear carrier 40 using a bolted assembly, for example.

Figure 3:
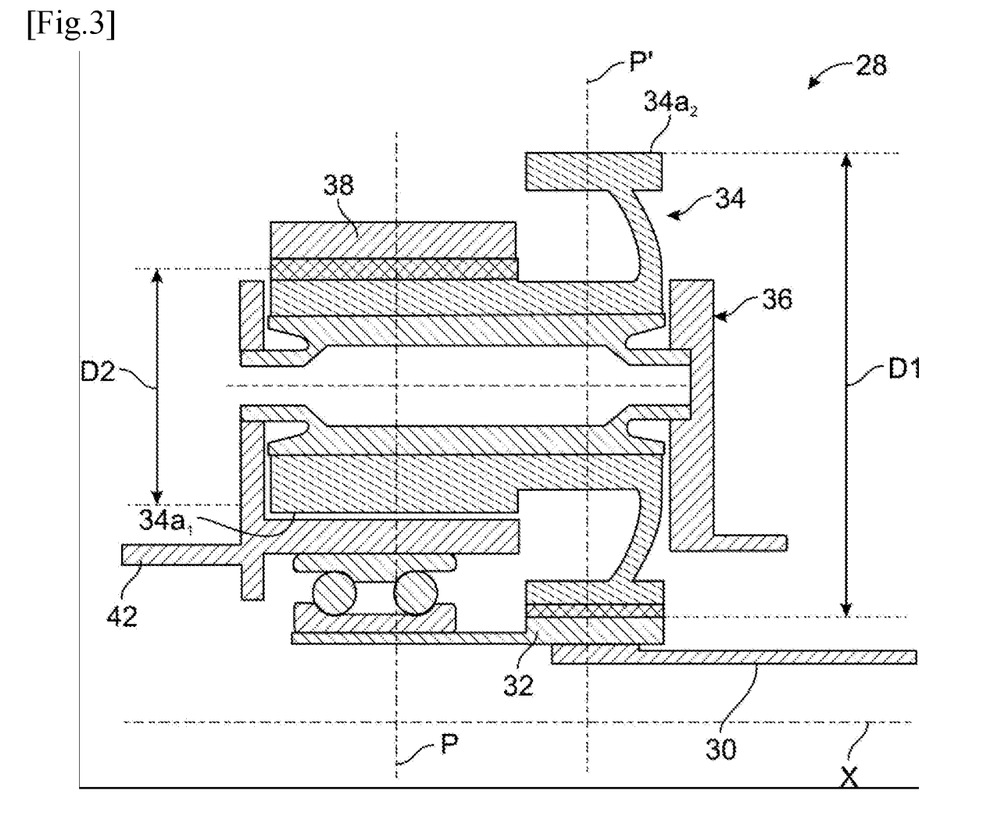
FIG. 3 is another partial axial sectional view of a mechanical reducer.

FIG. 3 shows another example of reducer architecture, referred to as a double meshing stage, in which each planet gear 34 comprises two separate toothings 34a1, 34a2 configured to cooperate respectively with the ring gear 38 and the sun gear 32.

In this FIG. 3, the elements already described in the foregoing are designated by the same references.

The toothing 34a1 meshing with the ring gear 38 has an average diameter D2 and is located in a median plane P. The toothing 34a2 meshing with the sun gear 32 has an average diameter D1 and is located in another median plane P'. The median planes P, P' are parallel to each other and perpendicular to the axis X. The diameter D2 is smaller than the diameter D1. Finally, each toothing 34a1, 34a2 comprises a single helix.

Figure 4:
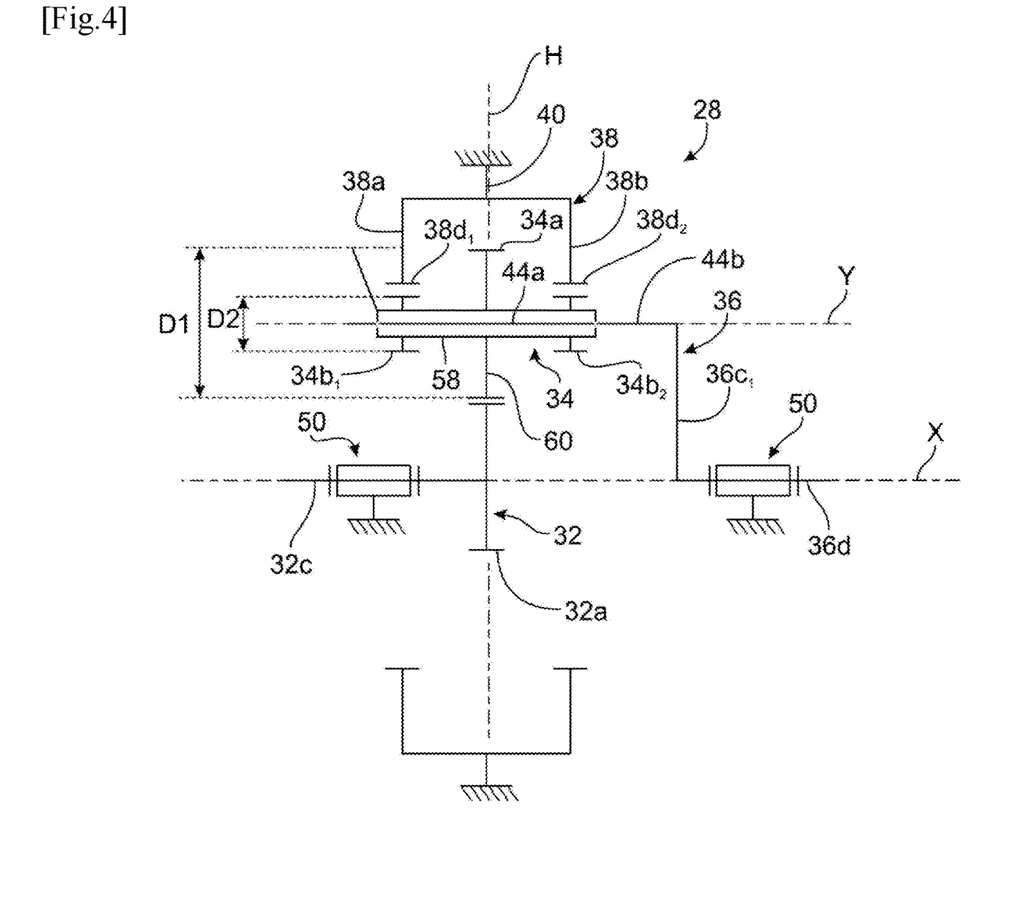
FIG. 4 is a schematic axial sectional view of a reducer with two symmetrical meshing stages for a device according to the invention.
Figure 5:
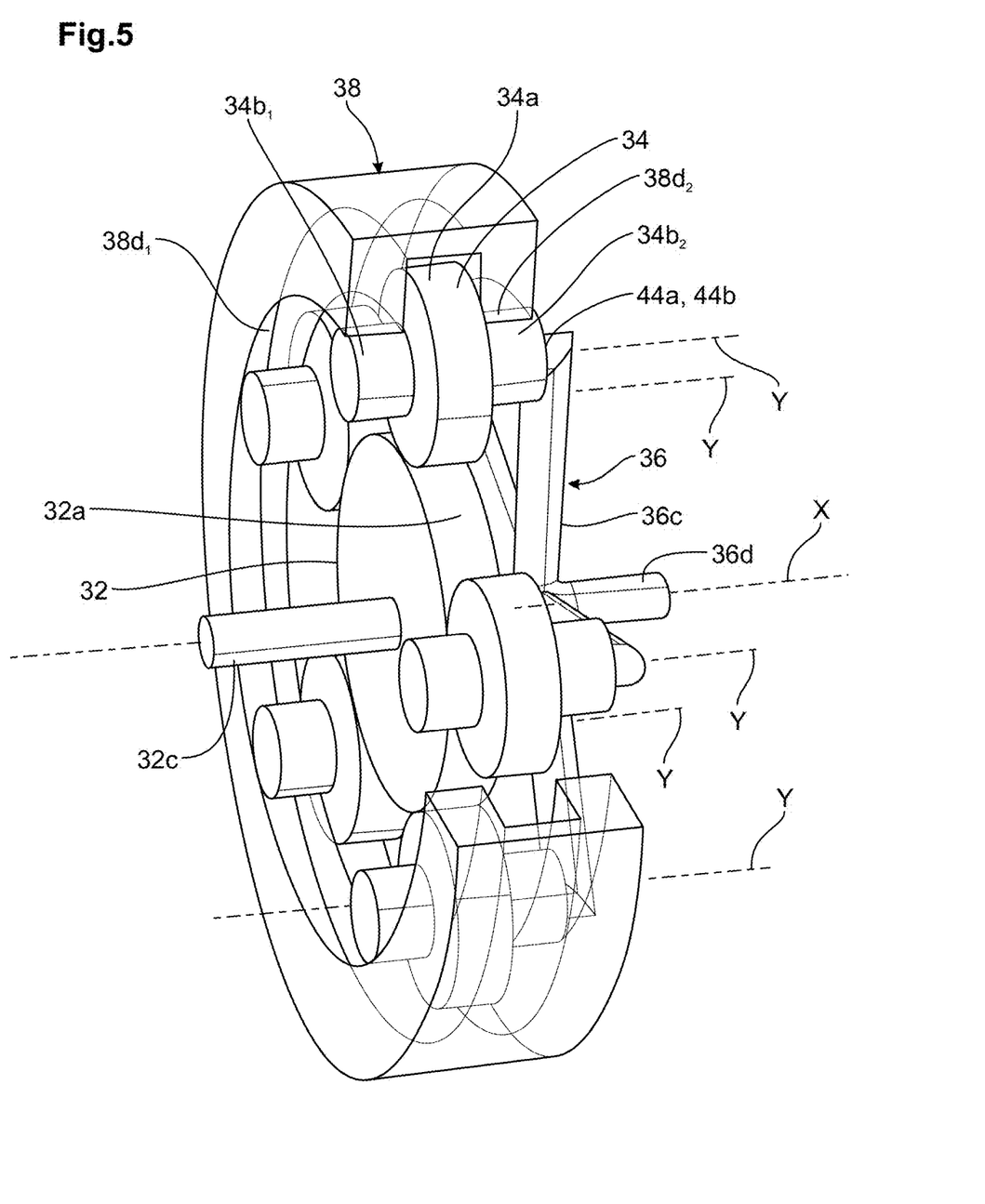
FIG. 5 is a schematic perspective view of a reducer of the type shown in FIG. 4.
Figure 6:
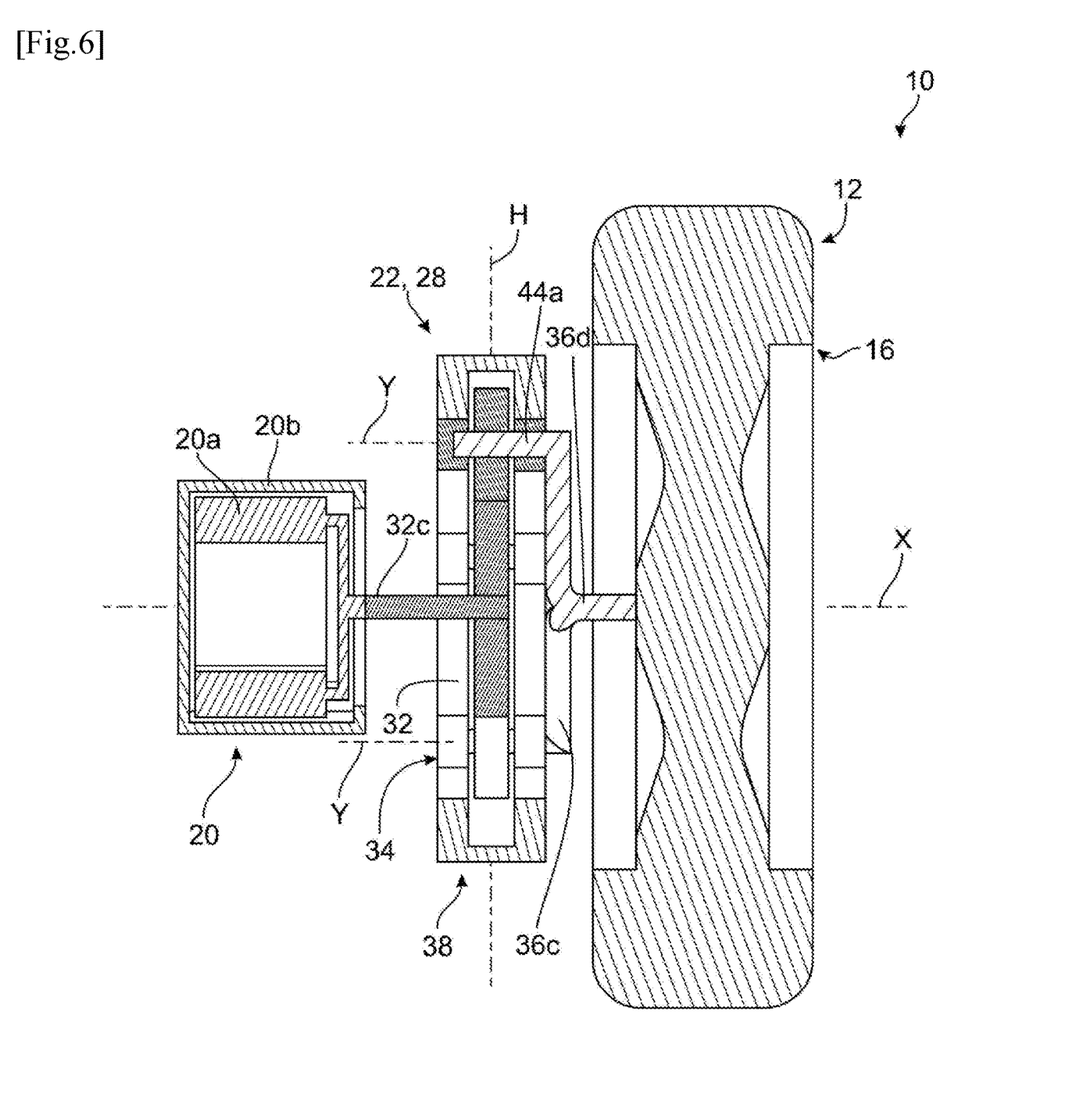
FIG. 6 is a schematic axial sectional view of a device according to the invention equipped with the reducer shown in FIG. 4.

FIGS. 4 to 6 show a reducer 28 with symmetrical double toothing and a device 10 for driving at least one wheel of an aircraft landing gear.

In the example shown, the reducer 28 is of the epicyclic train type and comprises:

a sun gear 32 having an axis of rotation X, a ring gear 38 which extends around the sun gear 32 and which is configured so that it cannot rotate about the axis X, and planet gears 34 which are meshed with the sun gear 32 and the ring gear 38 and which are maintained by a planet carrier 36 which is configured to be movable in rotation about the axis X.

The plane H is defined as a median plane perpendicular to the axis X and passing substantially through the middle of the reducer 28.

The sun gear 32 comprises an external toothing 32a for meshing with the planet gears 34. The toothing 32a can be of the herringbone type and have two series of adjacent teeth. The toothing 32a is symmetrical with respect to the plane H, its teeth being located on either side of the plane H.

In the example shown, the sun gear 32 comprises a shaft 32c which may be that of the motor 20 or which may be connected to the shaft of the motor 20, and a pinion comprising the external toothing 32a at its external periphery.

The ring gear 38 is formed by two independent annulus 38a, 38b and comprises two internal toothings 38d1, 38d2 carried respectively by the two annulus 38a, 38b.

The toothings 38d1, 38d2 can each be of the helix type. The toothings 38d1, 38d2 are symmetrical with respect to the plane H.

The annulus 38a, 38b are arranged symmetrically with respect to the plane H, which therefore extends between these annulus. The annulus 38a, 38b are connected and attached to a ring gear carrier 40 which is attached to a stator of the device 10.

As in the case of the ring gear 38, the ring gear carrier 40 is symmetrical with respect to the plane H which cuts the ring gear carrier 40 in its middle.

Each planet gear 34 comprises a median external toothing 34a of average diameter D1 for meshing with the sun gear 32, and two lateral external toothings 34b1, 34b2 of diameter D2, different from D1 and in particular less than D1, for meshing with the toothings 38d1, 38d2 of the ring gear 38.

These diameters are average diameters measured from the axis Y of each planet gear 34 and represent the average between the maximum diameter and the minimum diameter of a toothing of this planet gear.

The toothings 34b1, 34b2 are identical, as are the toothings 38d1, 38d2.

Each planet gear 34 comprises a cylindrical sleeve 58 and an annular web 60 extending substantially radially outwardly from the middle of this sleeve 58. The helical toothings 34b1 and 34b2 are located respectively on the axial ends of the sleeve 58. The herringbone toothing 34a are located at the external periphery of the web 60.

The toothing 34a is passed through in the middle by the plane H. The toothings 34b1, 34b2 are also arranged symmetrically with respect to the plane H.

The toothing 34a and the external periphery of the web 60 have an axial dimension which is less than the axial distance between the annulus 38a, 38b, so that each planet gear 34 can rotate freely in the ring gear carrier 40 and between the annulus 38a, 38b.

Each of the planet gears 34 is mounted on a cylindrical body 44a which passes through the planet gear 34, and in particular its sleeve 58, and which is attached to the planet carrier 36.

The body 44a of a bearing 44 extends along the axis Y and comprises at at least one of its longitudinal ends an extension 44b housed in an orifice forming a seat of the planet carrier 36.

The body 44a is generally tubular and comprises an internal oil circulation bore which generally communicates with oil supply conduits to an external cylindrical surface of the body for the formation of the oil film between this surface and an internal cylindrical surface of the planet gear 34.

In the context of the present invention, the sun gear 32 is coupled to the shaft 30 of the electric motor 20. The ring gear 38 is stationary and the planet carrier 36 is connected to the rim 16 of the wheel 12.

FIG. 6 shows that the motor 20 has an annular shape centred on the axis X and is arranged next to the reducer 28. Preferably, the motor 20 is positioned next to and at the level of the planet gears 34.

In the example shown in FIG. 4, the planet carrier 36 comprises a single transverse wall 36c1 which is perpendicular to the axis X and on which the planet gears 34 are cantilever-mounted. The aforementioned cylindrical bodies 44a are thus mounted by only one of their ends in orifices in this transverse wall 36c1.

The planet carrier 36 also comprises a shaft 36d or a segment of shaft connected to the rim 16. This connection can be made by a disengagement system which is able to adopt two positions: a first position in which the output shaft of the reducer 28, and in particular the shaft 36d, is coupled to the rim 16 or to the shaft of the rim, and a second position in which this output shaft is uncoupled from the rim 16, which is then freewheeling.

In FIG. 5, the transverse wall 36c is replaced by radial arms extending from the shaft 36d to the cylindrical bodies 44a. The number of these arms is equal to the number of planet gears 34 and the arms are preferably evenly distributed around the axis X.

As shown in FIG. 4, the shafts 32c, 36d are centred and guided in rotation about the axis X by bearings 50.

FIG. 6 shows that the motor 20 of the device 10 comprises a rotor 20a and a stator 20b. The rotor 20a has an annular shape and is connected to the shaft 32c. The stator 20b is annular in shape and extends around the rotor 20a and also on a side of the rotor 20a opposite the reducer 28. The ring gear 38 can be attached to the stator 20b.

Figure 7:
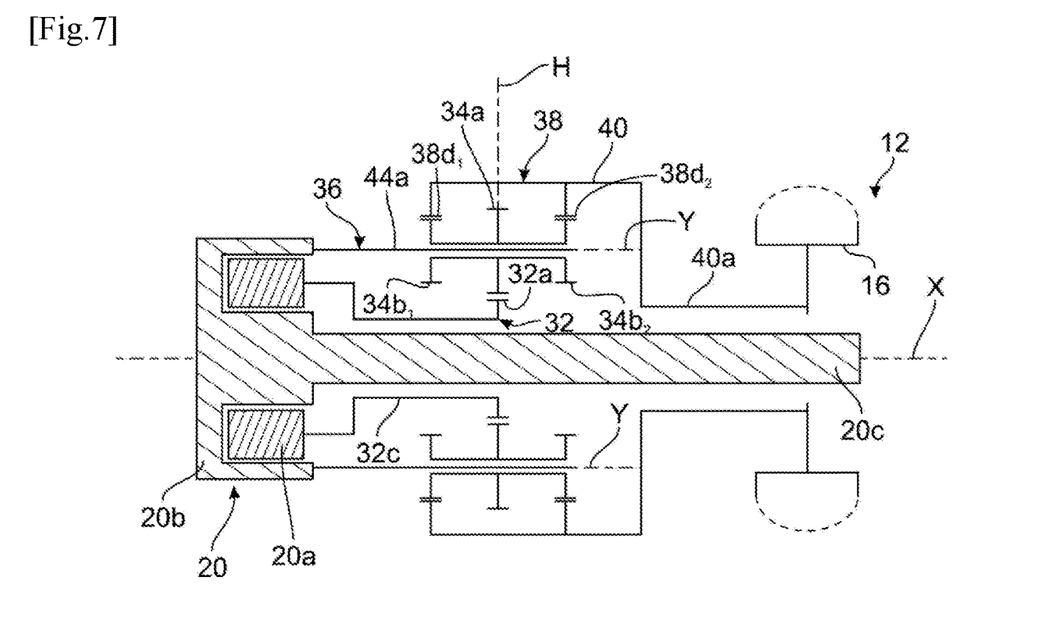
FIG. 7 is a schematic axial sectional view of an alternative embodiment of a device according to the invention.
Figure 8:
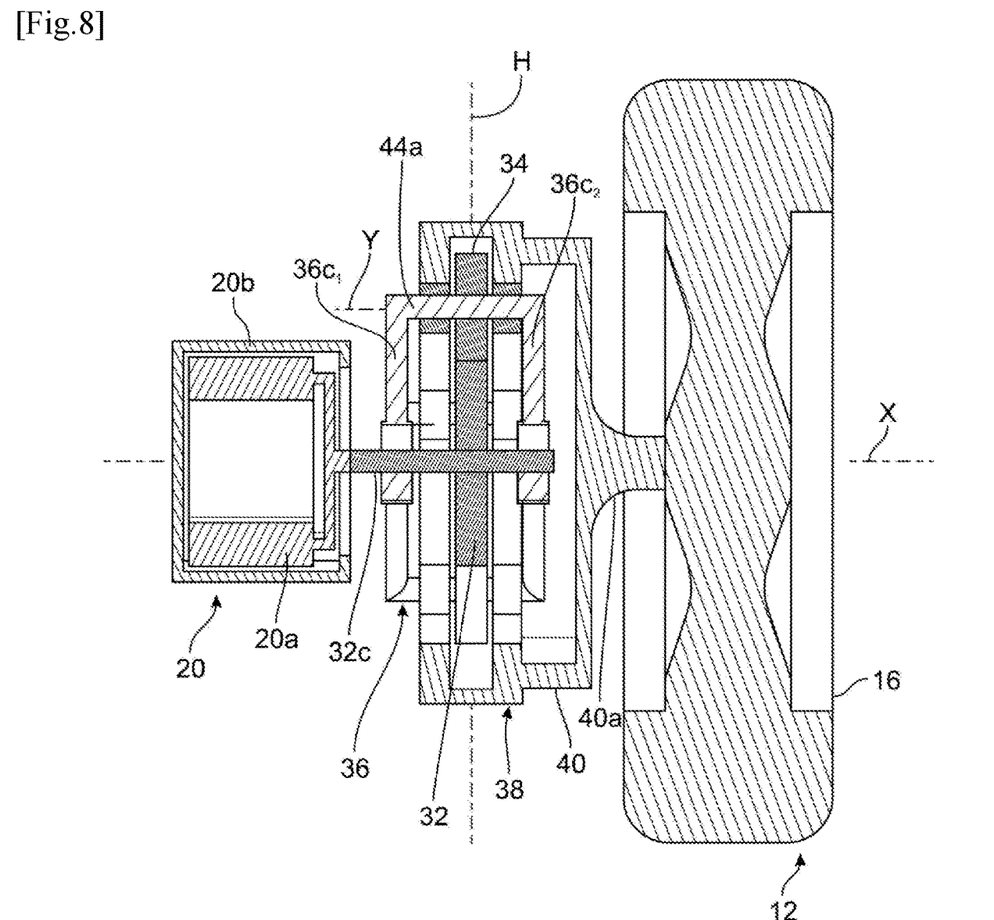
FIG. 8 is a schematic view in axial cross-section of another variant of embodiment of a device according to the invention.

In the embodiments shown in FIGS. 7 and 8, the reducer 28 is of the planetary train type and differs from the previous embodiment essentially in that its planet carrier 36 is stationary and its ring gear 38 is movable.

It is therefore the ring gear 38 that is attached to the rim 16 of the wheel 12. To achieve this, the ring gear carrier 40 is connected to the rim 16 or comprises a shaft segment 40a for connecting to the rim 16.

The planet carrier 36 is attached to the stator 20b of the electric motor 20, for example.

The other characteristics described above in relation to FIGS. 4 to 6 apply to the embodiments of FIGS. 7 and 8.

In the case of FIG. 7, it can be seen that the stator 20b of the motor 20 comprises a rod 20c which is centred on the axis X and which extends along the axis X successively passing through the reducer 28 and the rim 16.

In FIG. 8, it can be seen that the planet carrier 36 comprises two transverse walls 36c1, 36c2 which are perpendicular to the axis X and between which the planet gears 34 are mounted. At least one or both of these transverse walls 36c1, 36c2 comprises a central orifice through which the shaft segment 32c of the sun gear 32 passes. Each of the transverse walls 36c1, 36c2 could be replaced by a series of radial arms as described above. The cylindrical bodies 44a for mounting the planet gears 34 would then be connected to two arms via their two axial ends.

Figure 9:
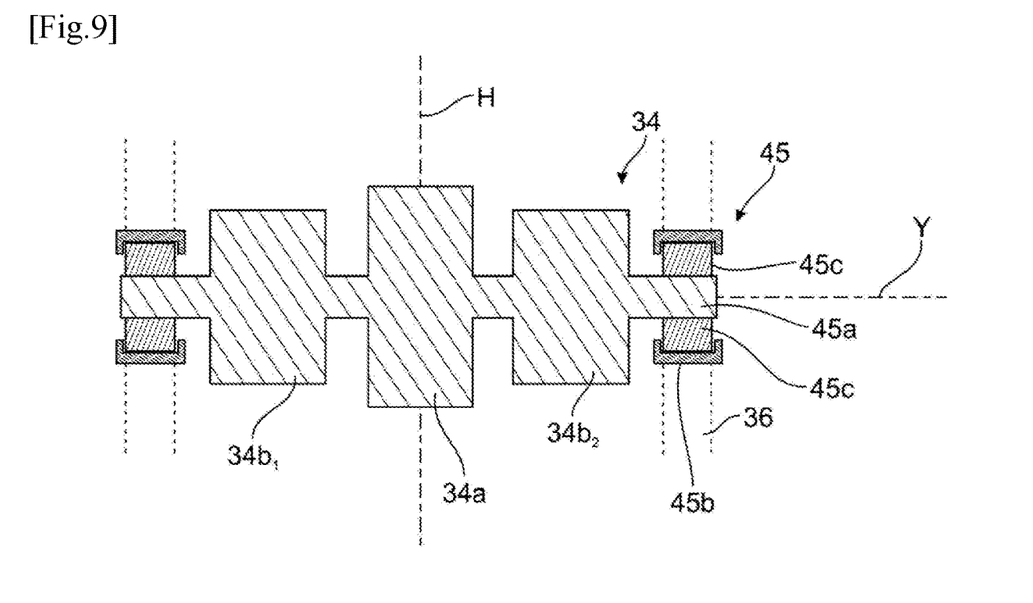
FIG. 9 is a schematic axial sectional view of a planet gear and guide bearings for guiding this planet gear.

FIG. 9 shows an example of how the planet gears 34 of the reducer 28 are guided. The planet gears 34 are guided by rolling bearings 45, which in this case are roller bearings. There are two guide bearings 45 for guiding each satellite 34, mounted around the longitudinal ends of this planet gear, between these ends and the planet carrier 36. Each of the bearings 45 comprises an internal ring 45a carried by the planet gear 34 or integrated into it, and an external ring 45b carried by the planet carrier 36. The rollers 45c are mounted between the rings 45a, 45b.

FIG. 9 shows that the toothings 34, 34b1, 34b2 of the planet gears 34 are located between the bearings 45. This arrangement allows the moments applied to the planet gears 34 by the gears to be balanced as effectively as possible.

Figure 10:
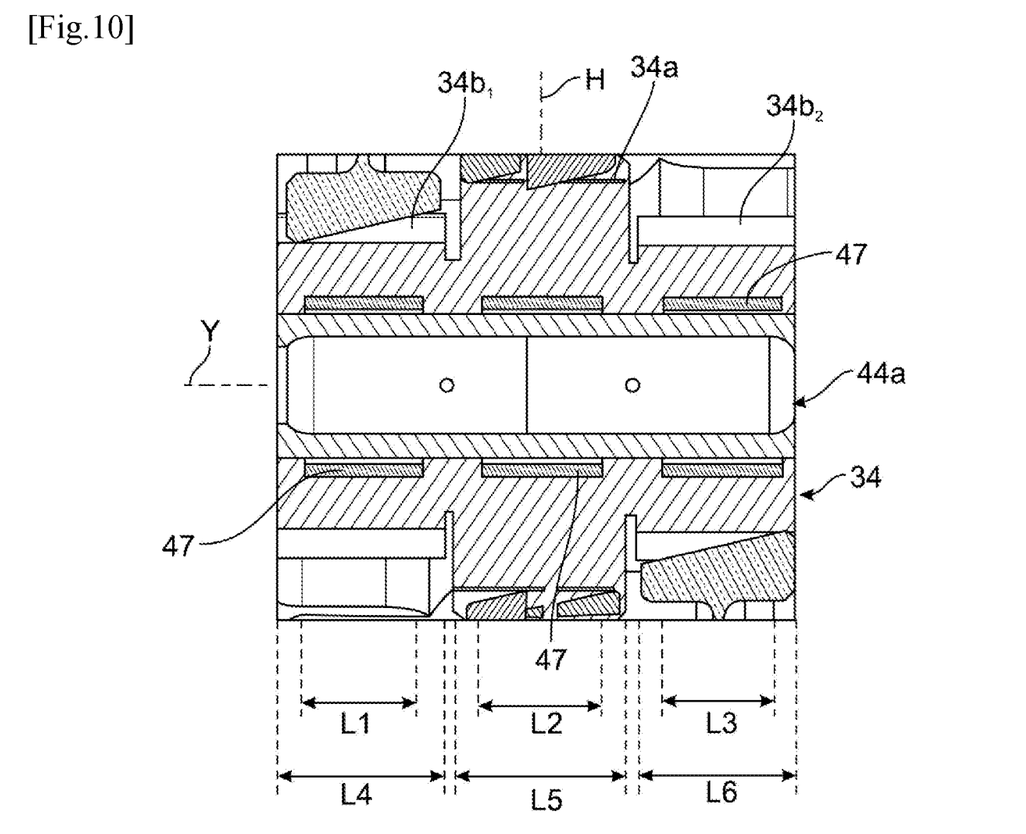
FIG. 10 is a schematic axial sectional view of a planet gear and guide bearings for guiding this planet gear.

Alternatively, as shown in FIG. 10, the planet gears 34 are guided by needle bearings 47. There are three of these bearings 47, mounted radially between the planet gears 34 and the bodies 44a. Each of the bearings 47 is radially aligned with one of the toothings 34a, 34b1, 34b2 of the planet gear 34. This assembly allows to reduce the axial overall dimension.

Each of the bearings 47 may have an axial length or dimension L1, L2, L3 measured along the axis Y, which is at least 80% of the axial length or dimension L4, L5, L6 of the corresponding toothing 34a, 34b1, 34b2.

In yet another variant embodiment not shown, the guide bearings 34 for guiding the planet gears are plain bearings or hydrodynamic bearings.

The reducer 28 as described above offers a high reduction ratio compared with the reducers of the prior technique, and has a small overall dimensions, these two parameters being important for the use of this reducer in a device for driving at least one wheel of an aircraft landing gear.

The invention claimed is:

1. An aircraft landing gear, comprising:
   at least one landing gear wheel, said wheel comprising a rim having an axis of rotation,
   an electric motor comprising a shaft,
   a mechanical transmission system between the shaft of the motor and the rim, said mechanical transmission system comprising a mechanical reducer,
   wherein the mechanical reducer comprises:
   a sun gear secured in rotation to the shaft of the motor, said sun gear being centered on the axis and comprising an external toothing,
   a ring gear centered on the axis and comprising two internal toothings, and
   planet gears which are carried by a planet carrier and which each have a median plane of symmetry perpendicular to the axis, each of the planet gears comprising three external toothings, including a median external toothing which is meshed with the toothing of the sun gear, and two lateral external toothings which are respectively arranged on either side of the median external toothing and which are respectively meshed with the toothings of the ring gear, and
   wherein the planet gears are each centered and guided by three needle bearings carried by the planet carrier, said three needle bearings including a median needle bearing that is radially in line with said median external toothing, and said three needle bearings further including two lateral needle bearings that are respectively radially in line with said lateral external toothings.

2. The aircraft landing gear according to claim 1, wherein the ring gear is stationary and is attached to a stator of the aircraft landing gear, and the planet carrier is movable in rotation about the axis and is attached to the rim.

3. The aircraft landing gear according to claim 1, wherein the ring gear is movable in rotation about the axis and is attached to the rim, and the planet carrier is stationary and is attached to a stator of the aircraft landing gear.

4. The aircraft landing gear according to claim 1, wherein the toothings of the ring gear are identical.

5. The aircraft landing gear according to claim 1, wherein the toothing of the sun gear and the median external toothing of each of the planet gears are herringbone-shaped.

6. The aircraft landing gear according to claim 1, wherein the lateral external toothings of each of the planet gears and the toothings of the ring gear are helical.

7. The aircraft landing gear according to claim 1, wherein the motor has an annular shape centered on the axis and is arranged next to the mechanical reducer.

8. The aircraft landing gear according to claim 1, wherein the motor is arranged next to and at the level of the planet gears.

9. The aircraft landing gear according to claim 1, wherein the median toothing has a diameter greater than the diameter of the lateral toothings.

10. The aircraft landing gear according to claim 1, wherein the planet carrier comprises a single transverse wall which is perpendicular to the axis and on which the planet gears are cantilevered.

11. The aircraft landing gear according to claim 1, wherein the planet carrier comprises two transverse walls which are perpendicular to the axis and between which the planet gears are mounted, at least one of these transverse walls or both comprising a central orifice for the passage of the shaft of the motor.

12. An aircraft landing gear comprising:
at least one landing gear wheel, said wheel comprising a rim having an axis of rotation,
an electric motor comprising a shaft,
a mechanical transmission system between the shaft of the motor and the rim, said mechanical transmission system comprising a mechanical reducer,
wherein the mechanical reducer comprises:
a sun gear secured in rotation to the shaft of the motor, said sun gear being centered on the axis and comprising an external toothing,
a ring gear centered on the axis and comprising two internal toothings, and
planet gears which are carried by a planet carrier and which each have a median plane of symmetry perpendicular to the axis, each of the planet gears comprising three external toothings, including a median external toothing which is meshed with the toothing of the sun gear, and two lateral external toothings which are respectively arranged on either side of the median external toothing and which are respectively meshed with the toothings of the ring gear, and
wherein the planet gears are each centered and guided by two roller bearings carried by the planet carrier, said three external toothings of each of the planet gears being located axially between these roller bearings which are then not located radially inside said three external toothings.

* * * * *